US012784473B2

(12) United States Patent
Wacquant

(10) Patent No.: US 12,784,473 B2
(45) Date of Patent: *Nov. 3, 2026

(54) VEHICLE CABIN MONITORING SYSTEM

(71) Applicant: Magna Electronics Inc., Auburn Hills, MI (US)

(72) Inventor: Sylvie Wacquant, Mainhausen (DE)

(73) Assignee: Magna Electronics Inc., Auburn Hills, MI (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/964,782

(22) Filed: Dec. 2, 2024

(65) Prior Publication Data

US 2025/0095387 A1 Mar. 20, 2025

Related U.S. Application Data

(63) Continuation of application No. 18/390,104, filed on Dec. 20, 2023, now Pat. No. 12,159,471, which is a (Continued)

(51) Int. Cl.

| | |
|---|---|
| ***G06V 40/10*** | (2022.01) |
| ***B60R 11/02*** | (2006.01) |
| ***B60R 11/04*** | (2006.01) |
| ***G05B 13/02*** | (2006.01) |
| ***G06V 20/59*** | (2022.01) |
| ***G06V 40/16*** | (2022.01) |
| ***G06V 40/20*** | (2022.01) |
| *B60R 11/00* | (2006.01) |

(52) U.S. Cl.

CPC ........ *G06V 20/597* (2022.01); *B60R 11/0247* (2013.01); *B60R 11/04* (2013.01); *G05B 13/0265* (2013.01); *G06V 40/10* (2022.01); *G06V 40/16* (2022.01); *G06V 40/174* (2022.01); *G06V 40/20* (2022.01); *B60R 2011/0003* (2013.01)

(58) Field of Classification Search

CPC ................ B60R 11/0247; B60R 11/04; B60R 2011/0003; G05B 13/0265; G06V 20/597; G06V 40/10; G06V 40/103; G06V 40/16; G06V 40/174; G06V 40/20

USPC ........................................................... 434/66

See application file for complete search history.

(56) References Cited

U.S. PATENT DOCUMENTS 4,435,042 A 3/1984 Wood et al.
4,436,371 A 3/1984 Wood et al.
(Continued)

*Primary Examiner* — Kathleen M Walsh
(74) *Attorney, Agent, or Firm* — HONIGMAN LLP

(57) ABSTRACT

A vehicular cabin monitoring system includes at least one interior-viewing camera viewing at least a driver and a passenger of a vehicle. Image data captured by the at least one interior-viewing camera is transferred to an electronic control unit (ECU) and is processed at the ECU. Based at least in part on processing at the ECU of image data captured by the at least one interior-viewing camera, the vehicular cabin monitoring system monitors the driver of the vehicle. Based at least in part on processing at the ECU of image data captured by the at least one interior-viewing camera, the system monitors the passenger of the vehicle. Based at least in part on monitoring of the driver, the system classifies the driver as being at least one selected from the group consisting of overloaded, attentive and distracted.

46 Claims, 7 Drawing Sheets

Related U.S. Application Data continuation of application No. 18/051,096, filed on Oct. 31, 2022, now Pat. No. 11,854,276, which is a continuation of application No. 16/718,860, filed on Dec. 18, 2019, now Pat. No. 11,488,399.

(60) Provisional application No. 62/781,802, filed on Dec. 19, 2018.

(56) References Cited

U.S. PATENT DOCUMENTS

| | | | |
|---|---|---|---|
| 4,712,879 | A | 12/1987 | Lynam et al. |
| 4,826,289 | A | 5/1989 | Vandenbrink et al. |
| 4,936,533 | A | 6/1990 | Adams et al. |
| 4,948,242 | A | 8/1990 | Desmond et al. |
| 5,066,112 | A | 11/1991 | Lynam et al. |
| 5,073,012 | A | 12/1991 | Lynam |
| 5,076,673 | A | 12/1991 | Lynam et al. |
| 5,076,674 | A | 12/1991 | Lynam |
| 5,100,095 | A | 3/1992 | Haan et al. |
| 5,115,346 | A | 5/1992 | Lynam |
| 5,140,455 | A | 8/1992 | Varaprasad et al. |
| 5,142,407 | A | 8/1992 | Varaprasad et al. |
| 5,151,816 | A | 9/1992 | Varaprasad et al. |
| 5,253,109 | A | 10/1993 | O'Farrell et al. |
| 5,327,288 | A | 7/1994 | Wellington |
| 5,406,414 | A | 4/1995 | O'Farrell et al. |
| 5,525,264 | A | 6/1996 | Cronin et al. |
| 5,550,677 | A | 8/1996 | Schofield et al. |
| 5,567,360 | A | 10/1996 | Varaprasad et al. |
| 5,570,127 | A | 10/1996 | Schmidt |
| 5,594,222 | A | 1/1997 | Caldwell |
| 5,610,756 | A | 3/1997 | Lynam et al. |
| 5,668,663 | A | 9/1997 | Varaprasad et al. |
| 5,670,935 | A | 9/1997 | Schofield et al. |
| 5,715,093 | A | 2/1998 | Schierbeek et al. |
| 5,724,187 | A | 3/1998 | Varaprasad et al. |
| 5,751,489 | A | 5/1998 | Caskey et al. |
| 5,760,962 | A | 6/1998 | Schofield et al. |
| 5,796,094 | A | 8/1998 | Schofield et al. |
| 5,820,097 | A | 10/1998 | Spooner |
| 5,877,897 | A | 3/1999 | Schofield et al. |
| 5,910,854 | A | 6/1999 | Varaprasad et al. |
| 5,949,331 | A | 9/1999 | Schofield et al. |
| 6,001,486 | A | 12/1999 | Varaprasad et al. |
| 6,002,511 | A | 12/1999 | Varaprasad et al. |
| 6,097,023 | A | 8/2000 | Schofield et al. |
| 6,154,306 | A | 11/2000 | Varaprasad et al. |
| 6,158,655 | A | 12/2000 | DeVries, Jr. et al. |
| 6,178,034 | B1 | 1/2001 | Allemand et al. |
| 6,201,642 | B1 | 3/2001 | Bos |
| 6,222,447 | B1 | 4/2001 | Schofield et al. |
| 6,310,611 | B1 | 10/2001 | Caldwell |
| 6,318,870 | B1 | 11/2001 | Spooner et al. |
| 6,320,176 | B1 | 11/2001 | Schofield et al. |
| 6,320,282 | B1 | 11/2001 | Caldwell |
| 6,329,925 | B1 | 12/2001 | Skiver et al. |
| 6,369,804 | B1 | 4/2002 | Sandbach |
| 6,396,397 | B1 | 5/2002 | Bos et al. |
| 6,437,258 | B1 | 8/2002 | Sandbach |
| 6,449,082 | B1 | 9/2002 | Agrawal et al. |
| 6,452,479 | B1 | 9/2002 | Sandbach |
| 6,480,103 | B1 | 11/2002 | McCarthy et al. |
| 6,483,438 | B2 | 11/2002 | DeLine et al. |
| 6,485,081 | B1 | 11/2002 | Bingle et al. |
| 6,492,980 | B2 | 12/2002 | Sandbach |
| 6,498,620 | B2 | 12/2002 | Schofield et al. |
| 6,501,465 | B2 | 12/2002 | Sandbach |
| 6,504,531 | B1 | 1/2003 | Sandbach |
| 6,540,193 | B1 | 4/2003 | DeLine |
| 6,552,342 | B2 | 4/2003 | Holz et al. |
| 6,559,435 | B2 | 5/2003 | Schofield et al. |
| 6,590,719 | B2 | 7/2003 | Bos |
| 6,593,565 | B2 | 7/2003 | Heslin et al. |
| 6,598,980 | B2 | 7/2003 | Marusawa et al. |
| 6,621,411 | B2 | 9/2003 | McCarthy et al. |
| 6,627,918 | B2 | 9/2003 | Getz et al. |
| 6,690,268 | B2 | 2/2004 | Schofield et al. |
| 6,693,517 | B2 | 2/2004 | McCarthy et al. |
| 6,698,905 | B1 | 3/2004 | Whitehead |
| 6,703,925 | B2 | 3/2004 | Steffel |
| 6,717,610 | B1 | 4/2004 | Bos et al. |
| 6,757,109 | B2 | 6/2004 | Bos |
| 6,768,420 | B2 | 7/2004 | McCarthy et al. |
| 6,783,167 | B2 | 8/2004 | Bingle et al. |
| 6,806,452 | B2 | 10/2004 | Bos et al. |
| 6,822,563 | B2 | 11/2004 | Bos et al. |
| 6,824,281 | B2 | 11/2004 | Schofield et al. |
| 6,831,261 | B2 | 12/2004 | Schofield et al. |
| 6,877,709 | B2 | 4/2005 | March et al. |
| 6,922,292 | B2 | 7/2005 | Bos |
| 6,946,978 | B2 | 9/2005 | Schofield |
| 7,004,606 | B2 | 2/2006 | Schofield |
| 7,038,577 | B2 | 5/2006 | Pawlicki et al. |
| 7,097,226 | B2 | 8/2006 | Bingle et al. |
| 7,184,190 | B2 | 2/2007 | McCabe et al. |
| 7,188,963 | B2 | 3/2007 | Schofield et al. |
| 7,195,381 | B2 | 3/2007 | Lynam et al. |
| 7,224,324 | B2 | 5/2007 | Quist et al. |
| 7,249,860 | B2 | 7/2007 | Kulas et al. |
| 7,253,723 | B2 | 8/2007 | Lindahl et al. |
| 7,255,451 | B2 | 8/2007 | McCabe et al. |
| 7,274,501 | B2 | 9/2007 | McCabe et al. |
| 7,289,037 | B2 | 10/2007 | Uken et al. |
| 7,338,177 | B2 | 3/2008 | Lynam |
| 7,360,932 | B2 | 4/2008 | Uken et al. |
| 7,420,756 | B2 | 9/2008 | Lynam |
| 7,446,924 | B2 | 11/2008 | Schofield et al. |
| 7,477,758 | B2 | 1/2009 | Piirainen et al. |
| 7,480,149 | B2 | 1/2009 | DeWard et al. |
| 7,580,795 | B2 | 8/2009 | McCarthy et al. |
| 7,626,749 | B2 | 12/2009 | Baur et al. |
| 7,636,188 | B2 | 12/2009 | Baur et al. |
| 7,720,580 | B2 | 5/2010 | Higgins-Luthman |
| 7,722,199 | B2 | 5/2010 | DeWard et al. |
| 7,741,666 | B2 | 6/2010 | Nozaki et al. |
| 7,855,755 | B2 | 12/2010 | Weller et al. |
| 7,914,187 | B2 | 3/2011 | Higgins-Luthman et al. |
| 8,049,640 | B2 | 11/2011 | Uken et al. |
| 8,256,821 | B2 | 9/2012 | Lawlor et al. |
| 8,258,932 | B2 | 9/2012 | Wahlstrom |
| 8,277,059 | B2 | 10/2012 | McCabe et al. |
| 8,446,470 | B2 | 5/2013 | Lu et al. |
| 8,451,107 | B2 | 5/2013 | Lu et al. |
| 8,508,831 | B2 | 8/2013 | De Wind et al. |
| 8,529,108 | B2 | 9/2013 | Uken et al. |
| 8,727,547 | B2 | 5/2014 | McCabe et al. |
| 8,730,553 | B2 | 5/2014 | De Wind et al. |
| 8,743,203 | B2 | 6/2014 | Karner et al. |
| 8,876,342 | B2 | 11/2014 | Wimbert et al. |
| 8,922,422 | B2 | 12/2014 | Klar et al. |
| 9,090,213 | B2 | 7/2015 | Lawlor et al. |
| 9,126,525 | B2 | 9/2015 | Lynam et al. |
| 9,174,578 | B2 | 11/2015 | Uken et al. |
| 9,280,202 | B2 | 3/2016 | Gieseke et al. |
| 9,346,403 | B2 | 5/2016 | Uken et al. |
| 9,405,120 | B2 | 8/2016 | Graf et al. |
| 9,487,159 | B2 | 11/2016 | Achenbach |
| 9,493,122 | B2 | 11/2016 | Krebs |
| 9,598,016 | B2 | 3/2017 | Blank et al. |
| 9,609,757 | B2 | 3/2017 | Steigerwald |
| 9,616,815 | B2 | 4/2017 | Mohan |
| 9,701,258 | B2 | 7/2017 | Tiryaki |
| 9,827,913 | B2 | 11/2017 | De Wind et al. |
| 9,878,669 | B2 | 1/2018 | Kendall |
| 9,900,490 | B2 | 2/2018 | Ihlenburg et al. |
| 10,017,114 | B2 | 7/2018 | Bongwald |
| 10,029,614 | B2 | 7/2018 | Larson |
| 10,046,706 | B2 | 8/2018 | Larson et al. |
| 10,065,574 | B2 | 9/2018 | Tiryaki |
| 10,071,687 | B2 | 9/2018 | Ihlenburg et al. |
| 10,099,614 | B2 | 10/2018 | Diessner |
| 10,166,924 | B2 | 1/2019 | Baur |
| 10,166,926 | B2 | 1/2019 | Krebs et al. |

(56) References Cited

U.S. PATENT DOCUMENTS 10,247,941 B2 4/2019 Fursich
10,261,648 B2 4/2019 Uken et al.
10,264,219 B2 4/2019 Mleczko et al.
10,315,573 B2 6/2019 Bongwald
10,421,404 B2 9/2019 Larson et al.
10,442,360 B2 10/2019 LaCross et al.
10,466,563 B2 11/2019 Kendall et al.
10,567,633 B2 2/2020 Ihlenburg et al.
10,567,705 B2 2/2020 Ziegenspeck et al.
10,703,204 B2 7/2020 Hassan et al.
10,735,664 B2 8/2020 Kunihiro
10,769,434 B2 9/2020 Weller et al.
10,850,746 B2 12/2020 Marti et al.
10,906,463 B2 2/2021 Pflug et al.
10,908,417 B2 2/2021 Fürsich
10,922,563 B2 2/2021 Nix et al.
10,946,798 B2 3/2021 Fursich et al.
10,958,830 B2 3/2021 Koravadi
10,963,741 B2 3/2021 Ambeck-Madsen
11,167,771 B2 11/2021 Caron et al.
11,201,994 B2 12/2021 Ihlenburg et al.
11,205,083 B2 12/2021 Lynam
11,214,199 B2 1/2022 LaCross et al.
11,240,427 B2 2/2022 Koravadi
11,242,008 B2 2/2022 Blank et al.
11,252,376 B2 2/2022 Ihlenburg
11,341,671 B2 5/2022 Lu et al.
11,348,374 B2 5/2022 Kramer et al.
11,433,906 B2 9/2022 Lu
11,465,561 B2 10/2022 Peterson et al.
11,488,399 B2 * 11/2022 Wacquant .............. G06V 40/10
11,493,918 B2 11/2022 Singh
11,518,401 B2 12/2022 Kulkarni
11,582,425 B2 2/2023 Liu
11,639,134 B1 5/2023 Huizen et al.
11,691,567 B2 7/2023 Huizen et al.
11,780,372 B2 10/2023 Sobecki et al.
11,854,276 B2 * 12/2023 Wacquant ............... B60R 11/04
11,890,990 B2 2/2024 Huizen et al.
12,159,471 B2 * 12/2024 Wacquant ............ G06V 40/103
2001/0022550 A1 9/2001 Steffel
2002/0005999 A1 1/2002 Hutzel et al.
2002/0024713 A1 2/2002 Roberts et al.
2003/0181822 A1 * 9/2003 Victor .................... A61B 3/113
600/558
2004/0113799 A1 6/2004 Geisler et al.
2004/0252993 A1 12/2004 Sato
2005/0073136 A1 4/2005 Larsson et al.
2005/0256635 A1 * 11/2005 Gardner ............. G01C 21/3641
340/995.23
2006/0050018 A1 3/2006 Hutzel et al.
2006/0171704 A1 8/2006 Bingle et al.
2007/0063854 A1 3/2007 Zhang et al.
2007/0124027 A1 5/2007 Betzitza et al.
2007/0182528 A1 8/2007 Breed et al.
2007/0182529 A1 8/2007 Dobler
2008/0310005 A1 12/2008 Tonar et al.
2009/0024436 A1 1/2009 Ingman et al.
2009/0040778 A1 2/2009 Takayanagi et al.
2009/0135493 A1 5/2009 Takayanagi et al.
2010/0033333 A1 2/2010 Victor et al.
2010/0085653 A1 4/2010 Uken et al.
2010/0214791 A1 8/2010 Schofield
2011/0080481 A1 4/2011 Bellingham
2011/0084198 A1 4/2011 McCabe et al.
2011/0188122 A1 8/2011 Habibi et al.
2012/0062743 A1 3/2012 Lynam et al.
2012/0203424 A1 8/2012 Filev et al.
2012/0218412 A1 8/2012 Dellantoni et al.
2012/0236136 A1 9/2012 Boddy
2013/0222592 A1 8/2013 Gieseke
2014/0022390 A1 1/2014 Blank et al.
2014/0218529 A1 8/2014 Mahmoud et al.
2014/0285666 A1 9/2014 O'Connell et al.
2014/0293169 A1 10/2014 Uken et al.
2014/0313563 A1 10/2014 Uken et al.
2014/0336876 A1 11/2014 Gieseke et al.
2014/0375476 A1 12/2014 Johnson et al.
2015/0009010 A1 1/2015 Biemer
2015/0015710 A1 1/2015 Tiryaki
2015/0022664 A1 1/2015 Pflug et al.
2015/0092042 A1 4/2015 Fursich
2015/0097955 A1 4/2015 De Wind et al.
2015/0124096 A1 5/2015 Koravadi
2015/0158499 A1 6/2015 Koravadi
2015/0232030 A1 8/2015 Bongwald
2015/0251599 A1 9/2015 Koravadi
2015/0294169 A1 10/2015 Zhou et al.
2015/0296135 A1 10/2015 Wacquant et al.
2015/0352953 A1 12/2015 Koravadi
2016/0036917 A1 2/2016 Koravadi et al.
2016/0137126 A1 5/2016 Fursich et al.
2016/0209647 A1 7/2016 Fursich
2016/0210853 A1 7/2016 Koravadi
2016/0221509 A1 8/2016 Takada et al.
2017/0177935 A1 6/2017 Weller et al.
2017/0217367 A1 8/2017 Pflug et al.
2017/0237946 A1 8/2017 Schofield et al.
2017/0274906 A1 9/2017 Hassan et al.
2017/0327037 A1 * 11/2017 Prakah-Asante ...... H04N 7/183
2017/0355312 A1 12/2017 Habibi et al.
2018/0009442 A1 1/2018 Spasojevic et al.
2018/0092557 A1 * 4/2018 Bickford ................ A61B 5/291
2018/0134217 A1 5/2018 Peterson et al.
2018/0222414 A1 8/2018 Ihlenburg et al.
2018/0231976 A1 8/2018 Singh
2019/0005341 A1 * 1/2019 Korthauer ............. B60W 40/08
2019/0054899 A1 2/2019 Hoyos et al.
2019/0118717 A1 4/2019 Blank et al.
2019/0146297 A1 5/2019 Lynam et al.
2019/0168669 A1 6/2019 Lintz et al.
2019/0213429 A1 * 7/2019 Sicconi .................. G06V 40/18
2019/0232966 A1 8/2019 Prakas-Asante et al.
2019/0258131 A9 8/2019 Lynam et al.
2019/0364199 A1 11/2019 Koravadi
2019/0381938 A1 12/2019 Hopkins
2020/0143560 A1 5/2020 Lu et al.
2020/0148120 A1 5/2020 Englander et al.
2020/0202151 A1 6/2020 Wacquant
2020/0320320 A1 10/2020 Lynam
2020/0327323 A1 10/2020 Noble
2020/0377022 A1 12/2020 LaCross et al.
2021/0056306 A1 2/2021 Hu et al.
2021/0122404 A1 4/2021 Lisseman et al.
2021/0155167 A1 5/2021 Lynam et al.
2021/0162926 A1 6/2021 Lu
2021/0245662 A1 8/2021 Blank et al.
2021/0291739 A1 9/2021 Kasarla et al.
2021/0306538 A1 9/2021 Solar
2021/0323473 A1 10/2021 Peterson et al.
2021/0368082 A1 11/2021 Solar
2022/0111857 A1 4/2022 Kulkarni
2022/0229309 A1 7/2022 Laskin et al.
2022/0242438 A1 8/2022 Sobecki et al.
2022/0254132 A1 8/2022 Rother
2022/0377219 A1 11/2022 Conger et al.
2023/0131471 A1 4/2023 Sobecki et al.
2023/0137004 A1 5/2023 Huizen et al.
2023/0302994 A1 9/2023 Miller et al.
2024/0017610 A1 1/2024 Ravichandran et al.
2024/0064274 A1 2/2024 Blank et al.

* cited by examiner

| Driving Workload | | Distraction Workload | | Driver Attention Estimation Module: calibration output function | Driver Attention Estimation Output State |
|---|---|---|---|---|---|
| **state** | **weight** | **state** | **weight** | | |
| $I_{driWo}$ | $W_{driWo}$ | $I_{distWo}$ | $W_{distWo}$ | h(MaxWorkload-($W_{driWo}$ * $I_{driWo}$ + $W_{distWo}$ * $I_{distWo}$)) <0 | g(0)% |
| $I_{driWo}$ | $W_{driWo}$ | $I_{distWo}$ | $W_{distWo}$ | h(MaxWorkload-($W_{driWo}$ * $I_{driWo}$ + $W_{distWo}$ * $I_{distWo}$)) >=0 | g(MaxWorkload-($W_{driWo}$ * $I_{driWo}$ + $W_{distWo}$ * $I_{distWo}$))% |

FIG. 6A

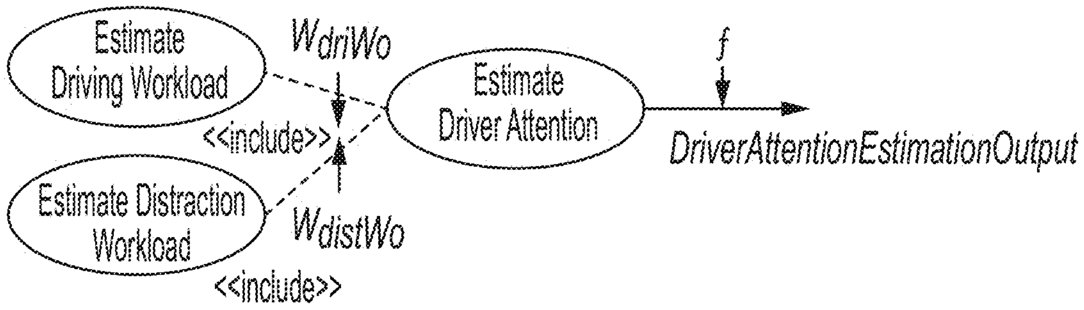

FIG. 6B

VEHICLE CABIN MONITORING SYSTEM

CROSS REFERENCE TO RELATED APPLICATIONS

The present application is a continuation of U.S. patent application Ser. No. 18/390,104, filed Dec. 20, 2023, now U.S. Pat. No. 12,159,471, which is a continuation of U.S. patent application Ser. No. 18/051,096, filed Oct. 31, 2022, now U.S. Pat. No. 11,854,276, which is a continuation of U.S. patent application Ser. No. 16/718,860, filed Dec. 18, 2019, now U.S. Pat. No. 11,488,399, which claims the filing benefits of U.S. provisional application Ser. No. 62/781,802, filed Dec. 19, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance method or system or driver monitoring method or system for a vehicle that may utilize one or more cameras to capture image data representative of images exterior and interior of the vehicle. The method includes estimating a distraction workload of the driver and estimating a driving workload of the driver. Based on the distraction workload and the driving workload (and optionally based in part on a determined maximum workload), the method includes determining an amount of driver attention.

Thus, the present invention gathers an estimation of the driver's current physical and mental state, which includes, for example, the driver's physical position and driving attention along with input from a plurality of signals available in a vehicle (e.g., a camera system).

These and other objects, advantages, purposes and features of the present invention will become apparent upon review of the following specification in conjunction with the drawings.

BRIEF DESCRIPTION OF THE DRAWINGS

FIG. 6A is an exemplary table for determining driver attention;

FIG. 6B is a flow chart for determining driver attention; and

DESCRIPTION OF THE PREFERRED EMBODIMENTS

A vehicle vision system and/or driver assist system and/or driver monitoring system and/or alert system operates to capture images exterior and interior of the vehicle and may process vehicle data and the captured image data to display images and to detect objects at or near the vehicle and in the predicted path of the vehicle, such as to assist a driver of the vehicle in maneuvering the vehicle or monitor the workload of the driver. The driver monitoring system includes an image processor or image processing system that is operable to receive image data from one or more cameras and vehicle sensor signals and provide an output to a display device for displaying images representative of the captured image data. Optionally, the driver monitoring system may provide display, such as a rearview display or a top down or bird's eye or surround view display or the like.

Figure 1:
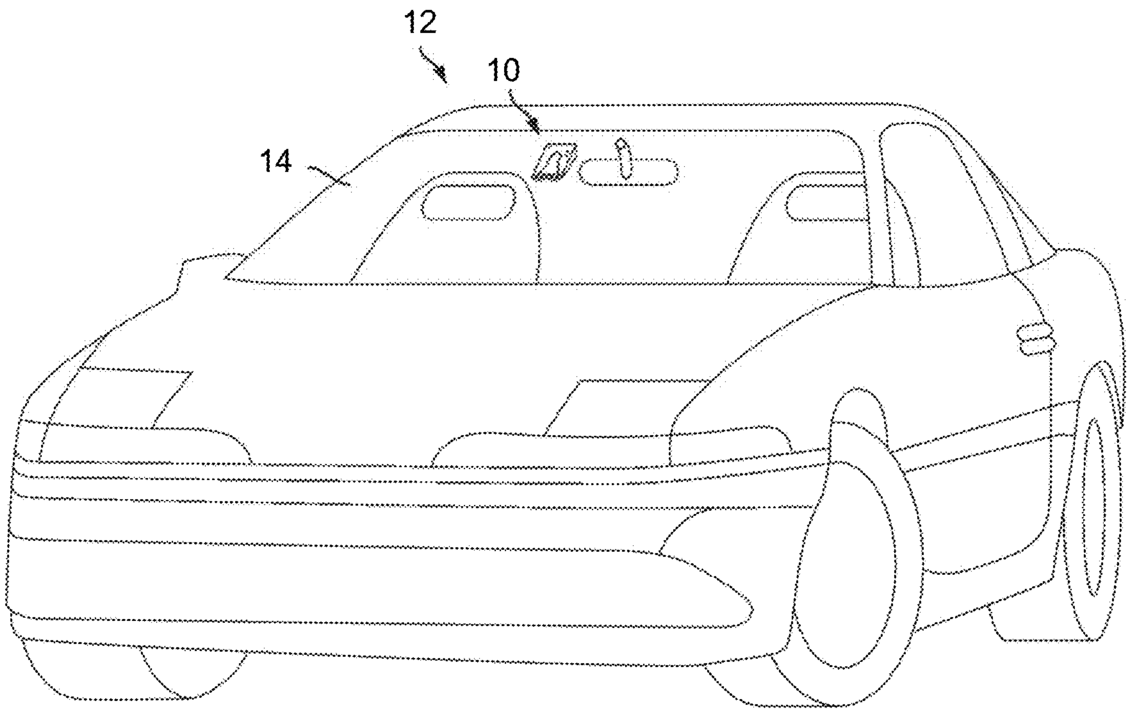
FIG. 1 is a perspective view of a vehicle with a driver monitoring system that incorporates at least a forward camera module.

Referring now to the drawings and the illustrative embodiments depicted therein, a driver monitoring system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. Optionally, the system may include multiple interior viewing imaging sensors or cameras, such as a camera with a field of view of the driver's head and torso and/or a camera with a field of view of one or more passengers. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The driver monitoring system 10 may also include an interior camera positioned above the steering wheel and another interior camera positioned above a rearview mirror assembly. The driver monitoring system 10 includes a control or electronic control unit (ECU) disposed at the vehicle, with the ECU including electronic circuitry and associated software. The circuitry may include a data processor for processing data provided to the ECU. The control is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
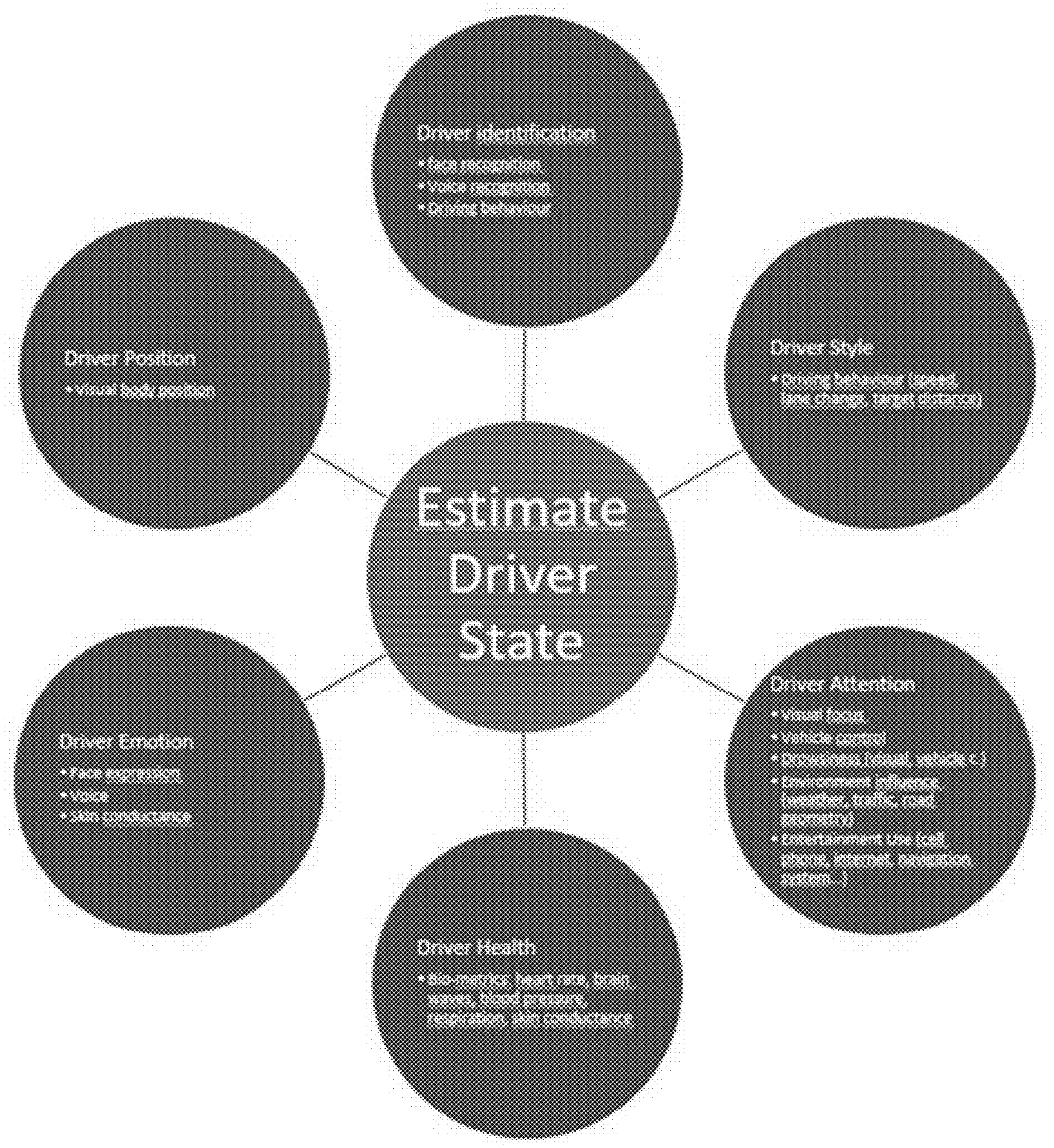
FIG. 2 is a block diagram illustrating inputs used to estimate a current driver state.
Figure 3:
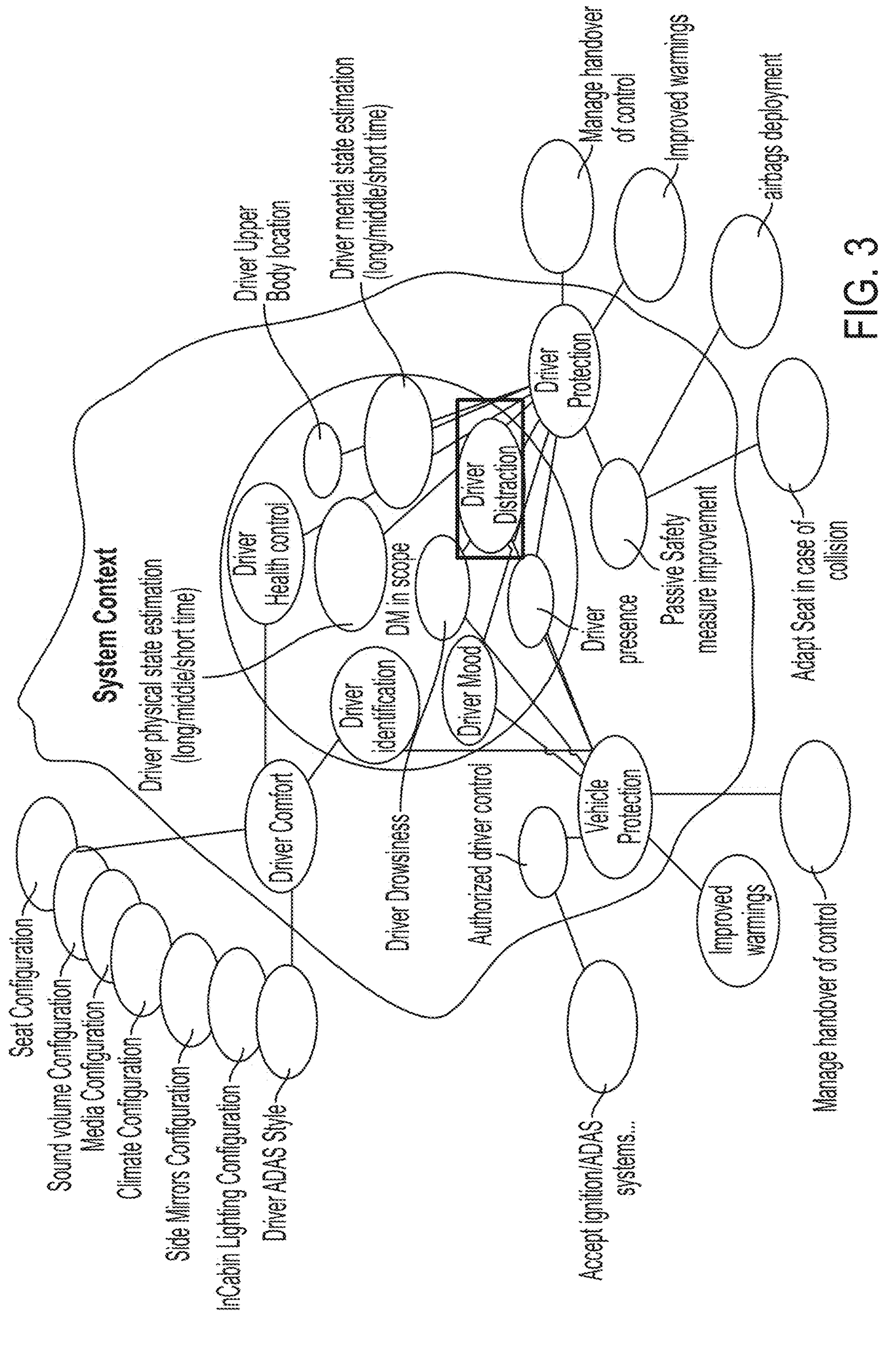
FIG. 3 is a block diagram illustrating a system context of the driver monitoring system.

The present invention provides a driver monitoring method or system that measures, estimates, or otherwise computes the attention of the driver based on evaluation or estimation of the driver workload and distraction workload or level. Because a system cannot "open the brain" of a driver, the real-time system investigates the driver's physical and mental conditions based on processing of driver and driver context information. As shown in FIG. 2 and FIG. 3, the system estimates a state of the driver based on a number of inputs. For example, the system may identify the driver (e.g., by face recognition using cameras, by voice recognition using microphones, or via recognized driving behavior). The system may also incorporate the style of the driver through measured driving behavior (e.g., speed, braking, accelerating, lane changing, target distances, etc.). The system may also include the driver's position or posture (i.e., the visual body position of the driver), the emotions of the driver (e.g., through facial expressions, voice, or skin conductance), and the health of the driver (e.g., through biometrics such as heart rate, brain waves, blood pressure, respiration, and skin conductance). Additionally, driver focus or attention may be estimated or measured through, for example, visual focus, vehicle control, drowsiness (estimated visually or through vehicle controls), environment influences (e.g., weather information, traffic information, infrastructure information, road conditions and geometry, visibility information), climate control usage, audio data captured by a microphone, and entertainment use (cell phone, internet, navigation, audio volume, etc.).

In some examples, the system may also monitor one or more passengers of the vehicle based on a portion of the same information. For example, the system may determine an amount or degree of passenger attention based on image data captured by an interior camera of the vehicle. Additionally, the passenger monitoring may refine the driver estimations. For example, if the system determines that a passenger of the vehicle is adjusting the radio (e.g., via an interior camera), the system may not adjust the driver's distraction level.

Figure 4:
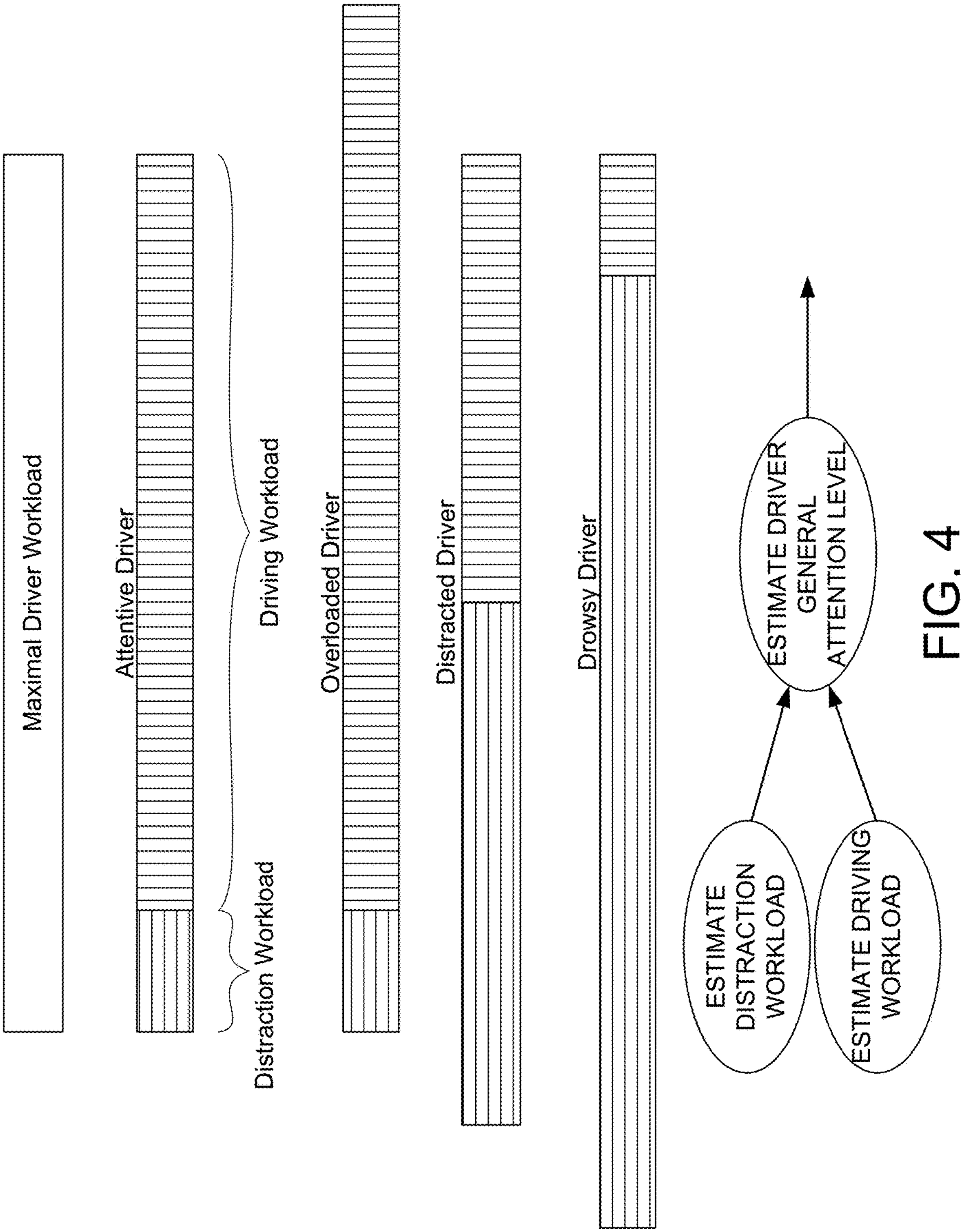
FIG. 4 is a chart illustrating driver classifications of the driver monitoring system.

Referring now to FIG. 4, the driver monitoring system may estimate an amount of driver attention by determining a maximum driver workload (such as a maximum workload that should be attributed to a driver based on driving conditions, driver information and/or the like) and then estimating a distraction workload of the driver and a driving workload of the driver. The maximum driver workload may be initialized to a predetermined value. The predetermined value may be adjusted, for example, based on driver information (e.g., driver age, driver experience, etc.). The sum of the driving workload and the distraction workload should not exceed the determined maximum workload for the driver.

Figure 5:
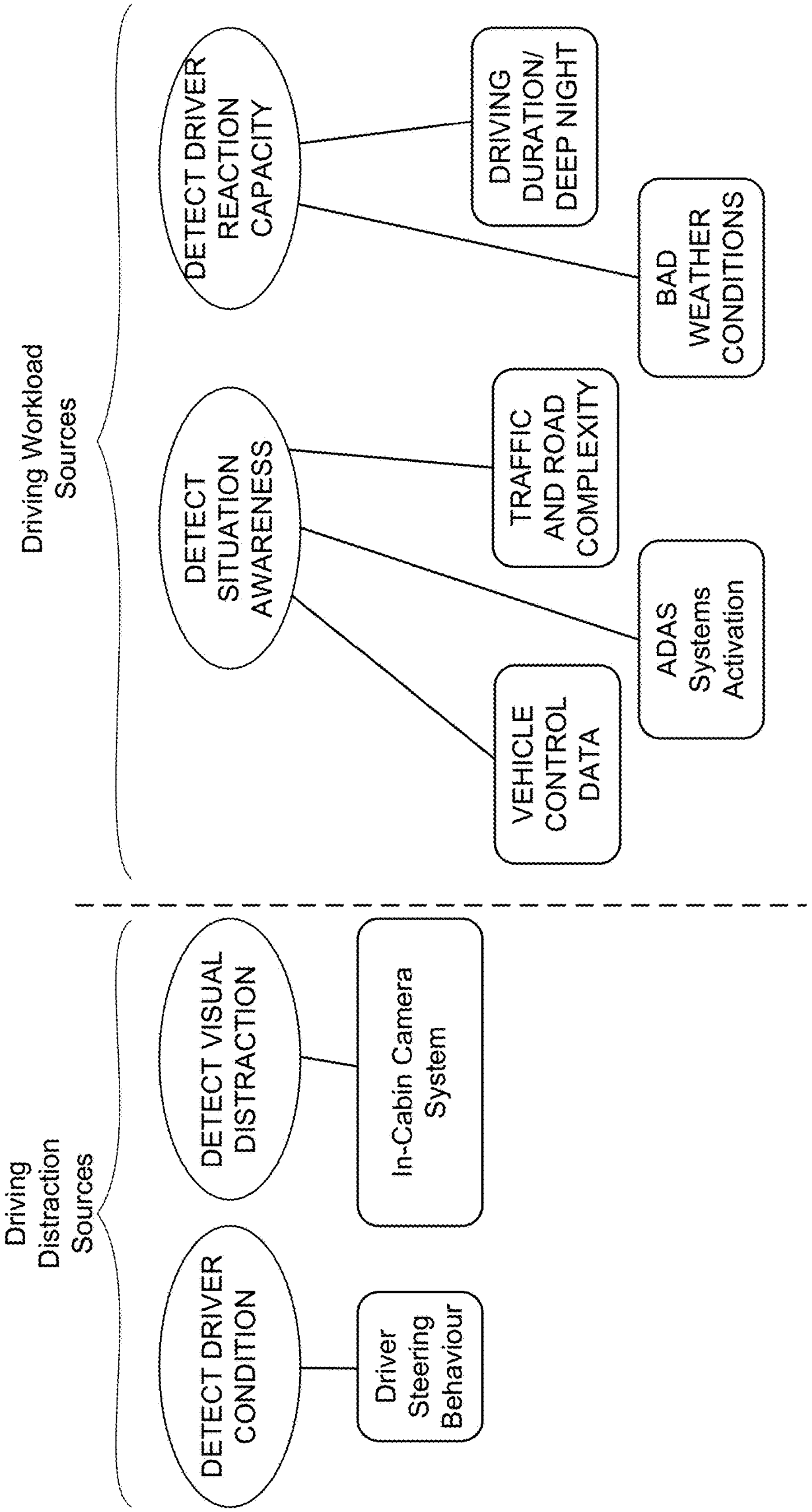
FIG. 5 is a chart illustrating driver information inputs to the driver monitoring system.

As shown in FIG. 5, the distraction workload may be estimated by processing, via the control, inputs from the media system (e.g., volume, channel changes, navigation usage, internet usage, etc.) detect the driver condition (e.g., via the driver steering behavior), and/or through detecting visual distraction (e.g., via the in-cabin camera system, gaze direction when driving targets are detected, etc.). The driver workload may be estimated by processing, via the control or processor, control inputs and inputs from the in-cabin camera system (e.g., to detect visual driving). The drowsiness of the driver may be measured through, for example, facial expressions (closing eyes, yawning, etc.) and steering profile (i.e., a "coffee cup system"). The driver workload may also incorporate the situation awareness of the driver or required by the driver. For example, the system may use vehicle control data, advanced driver-assistance systems (ADAS) inputs/outputs, and traffic and road complexity (e.g., measured via cameras, radar, GPS, and the like). A reaction capacity of the driver may also be detected via, for example, measured weather conditions (via sensors or weather reports for the area), driving duration, and driving times (e.g., late at night).

FIG. 6A illustrates a table providing exemplary equations for calculating the amount of driver attention. Both the driving workload and the distraction workload may be weighted (i.e., $W_{driWo}$ and $W_{distWo}$). The weights may start at a default value that is different or equal (e.g., each may start at 0.5). The weights may be updated through testing or through use as the driver operates the vehicle. The weights may change due to conditions (e.g., road or weather conditions) or due to a particular driver or driver condition. That is, the weights or weighting factors or values may be associated with a specific driver based on behavior observed during previous trips. As shown in FIG. 6A, determining the amount of driver attention may include subtracting the sum of the weighted driving workload and the weighted distraction workload from the maximum workload. The amount of driver attention may be expressed as a percentage between zero and one hundred. FIG. 6B provides a flow chart illustrating the combination of driving workload and distraction workload to determine the driver attention.

Figure 7:
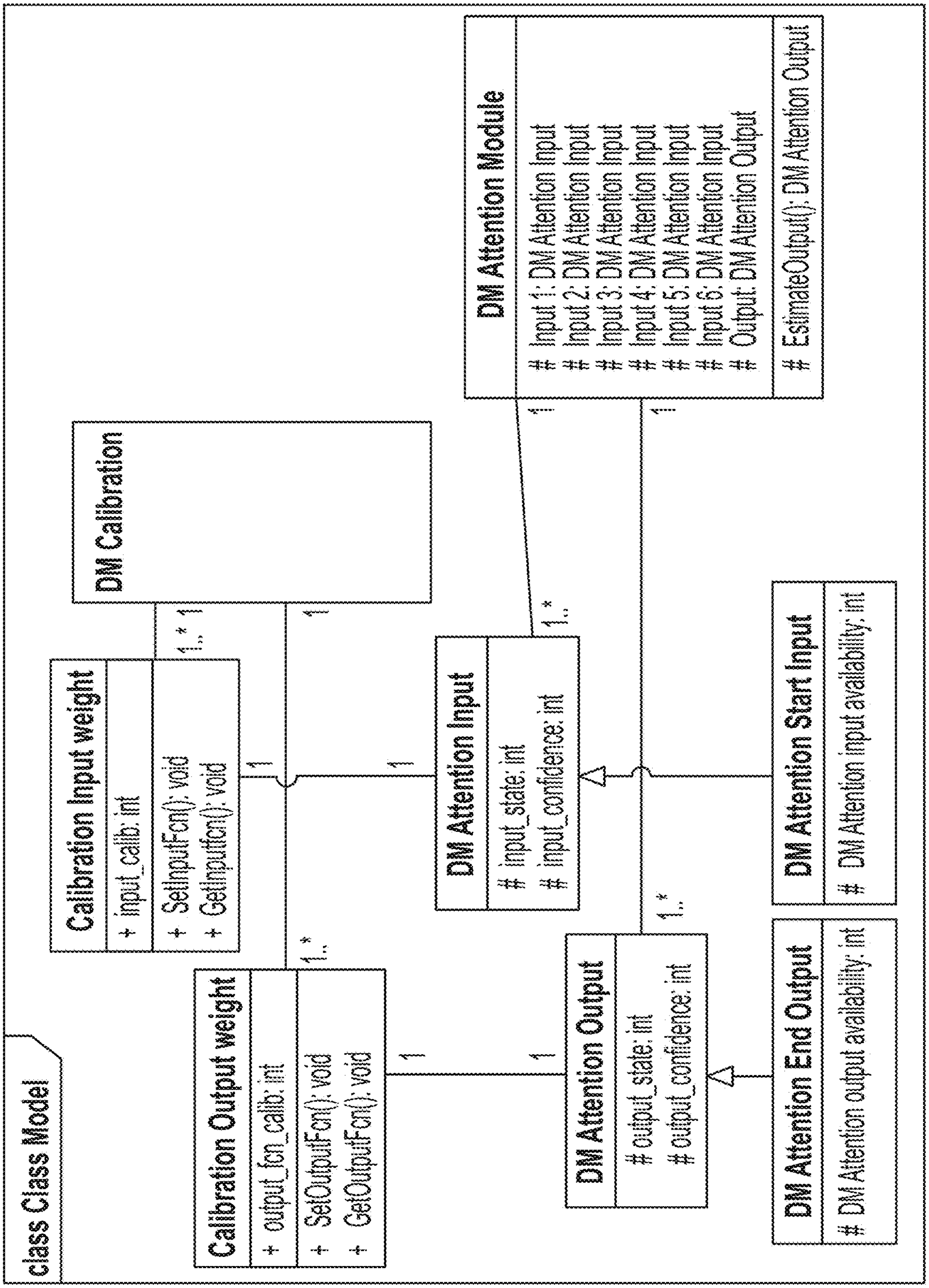
FIG. 7 is a block diagram illustrating an exemplary module construction of the driver monitoring system.

Referring now to FIG. 7, the driver monitoring system may include a number of modules. Each module may accept any number of inputs, and each input includes a current state of the input and a confidence of the input. Each input may also include an availability value (i.e., having a consequence on following confidence). Each input may also include a calibration input weight. The calibration input weights may being at a default value that may dynamically change in response to testing or use. Each module also includes at least one output. Each output contains a state and a confidence of the state. Each output may include a calibration output function that may be initially set to a default function that dynamically changes during testing or operation.

Thus, the present invention uses the notion that increases in the difficulty of one task will result in a loss of performance of another task (i.e., attention is finite). To this end, the present invention estimates the driver attention general level with the distribution of driving and distraction workload. If the driving task's complexity increases (e.g., complex surroundings, weather situations, hour context, etc.), the driver may become overloaded and his or her attention will be lowered. When the driver is concentrated on the road, the system determines the presence of a fully attentive driver. If the driver is highly distracted (e.g., cell phone use), the system measures a lowered or reduced attention. When the driver is drowsy (via the driver steering behavior or via the in-cabin camera system), the system measures a lowered or reduced attention. In all of the described cases, the system assigns a confidence to the inputs (and an availability of the inputs). The system includes calibration elements that may be adjusted in response to testing or use. Additionally, future outputs may be predicted through the use of machine learning algorithms adjusting the calibration elements.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like (e.g., any object posing a risk of collision or danger for the vehicle, the passengers, or the object itself) in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle. They system may also check if the awareness of the driver is set in the direction of the detected object or vehicle or hazardous condition and, when the system determines the driver's awareness is not in the direction of the detected object, the system may take control of the vehicle autonomously (e.g., braking and/or steering to avoid the object). The system may determine a risk level and only take control when the risk level exceeds a risk threshold.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321, 111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize aspects of head and face direction and position tracking systems and/or eye tracking systems and/or gesture recognition systems and/or driver identify and/or emotion recognition systems and/or health characteristics systems and/or voice characteristics systems and/or driving behavior systems. Such head and face direction and/or position tracking systems and/or eye tracking systems and/or gesture recognition systems may utilize aspects of the systems described in U.S. Publication Nos. US-2016-0137126; US-2015-0352953; US-2015-0296135; US-2015-0294169; US-2015-0232030; US-2015-0022664; US-2015-0015710; US-2015-0009010 and/or US-2014-0336876, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular cabin monitoring system, the vehicular cabin monitoring system comprising:

- at least one interior-viewing camera disposed at a vehicle equipped with the vehicular cabin monitoring system, the at least one interior-viewing camera viewing at least a driver of the vehicle and a passenger of the vehicle, wherein the at least one interior-viewing camera is operable to capture image data;
- wherein each camera of the at least one interior-viewing camera comprises an imaging array having at least one million photosensor elements arranged in rows and columns;
- an electronic control unit (ECU), the ECU comprising electronic circuitry and associated software, wherein the electronic circuitry comprises a data processor;
- wherein image data captured by each camera of the at least one interior-viewing camera is transferred to the ECU and is processed at the ECU;
- wherein, based at least in part on processing at the ECU of image data captured by the at least one interior-viewing camera, the vehicular cabin monitoring system monitors the driver of the vehicle;
- wherein, based at least in part on processing at the ECU of image data captured by the at least one interior-viewing camera, the vehicular cabin monitoring system monitors the passenger of the vehicle; and
- wherein, based at least in part on monitoring of the driver, the vehicular cabin monitoring system classifies the driver as being at least one selected from the group consisting of (i) overloaded, (ii) attentive and (iii) distracted;
- wherein the driver is classified based in part on an estimated current driving workload of the driver of the vehicle; and
- wherein the estimated current driving workload is updated during operation of the vehicle.

2. The vehicular cabin monitoring system of claim 1, wherein the vehicular cabin monitoring system classifies the driver based in part on monitoring of the passenger.

3. The vehicular cabin monitoring system of claim 2, wherein, based on monitoring of the passenger, the vehicular cabin monitoring system determines activity of the passenger, and wherein the vehicular cabin monitoring system classifies the driver based in part on the determined activity of the passenger.

4. The vehicular cabin monitoring system of claim 3, wherein the determined activity of the passenger comprises the passenger adjusting a radio of the vehicle.

5. The vehicular cabin monitoring system of claim 1, wherein the at least one interior-viewing camera comprises (i) a driver-viewing camera that views at least the driver of the vehicle and (ii) a passenger-viewing camera that views at least the passenger of the vehicle.

6. The vehicular cabin monitoring system of claim 5, wherein the vehicular cabin monitoring system monitors the driver of the vehicle based at least in part on processing at the ECU of image data captured by the driver-viewing camera, and wherein the vehicular cabin monitoring system monitors the passenger of the vehicle based at least in part on processing at the ECU of image data captured by the passenger-viewing camera.

7. The vehicular cabin monitoring system of claim 1, wherein the at least one interior-viewing camera comprises (i) a first camera that views at least the driver of the vehicle and a passenger of the vehicle and (ii) a second camera that views at least a passenger of the vehicle.

8. The vehicular cabin monitoring system of claim 7, wherein the passenger viewed by the first camera and the passenger viewed by the second camera are the same person.

9. The vehicular cabin monitoring system of claim 1, wherein the estimated current driving workload of the driver of the vehicle is based at least in part on a current driving condition of the vehicle.

10. The vehicular cabin monitoring system of claim 9, wherein the current driving condition comprises a current road condition.

11. The vehicular cabin monitoring system of claim 1, wherein the estimated current driving workload is updated responsive to tendencies extracted from data collected from other vehicles.

12. The vehicular cabin monitoring system of claim 1, wherein the estimated current driving workload is updated based at least in part on monitoring of the passenger of the vehicle.

13. The vehicular cabin monitoring system of claim 1, wherein the estimated current driving workload is estimated based at least in part on at least one selected from the group consisting of (i) a driving condition, (ii) a traffic condition and (iii) a driver reaction capacity.

14. The vehicular cabin monitoring system of claim 1, wherein the vehicular cabin monitoring system estimates a maximum driving workload of the driver based at least in part on a driving condition of the vehicle.

15. The vehicular cabin monitoring system of claim 1, wherein the estimated current driving workload is estimated based at least in part on a driving condition of the vehicle, and wherein the driving condition is estimated based on at least one selected from the group consisting of (i) traffic, (ii) infrastructure, (iii) weather and (iv) visibility.

16. The vehicular cabin monitoring system of claim 1, wherein the vehicular cabin monitoring system determines, at least in part via processing at the ECU of driver information pertaining to the driver of the vehicle, a maximum driving workload attributable to the driver.

17. The vehicular cabin monitoring system of claim 16, wherein the driver information comprises at least one selected from the group consisting of (i) braking behavior, (ii) acceleration behavior, (iii) lane keeping behavior, (iv) entertainment console usage, (v) climate control usage and (vi) audio data captured by an interior microphone of the vehicle.

18. The vehicular cabin monitoring system of claim 16, wherein the driver information comprises at least one selected from the group consisting of (i) driver position, (ii) driver identification, (iii) driver style, (iv) driver attention and (v) driver health.

19. The vehicular cabin monitoring system of claim 1, wherein monitoring of the driver of the vehicle is based at least in part on at least one selected from the group consisting of (i) vehicle entertainment information, (ii) driver condition information and (iii) visual distraction information.

20. The vehicular cabin monitoring system of claim 1, wherein the vehicular cabin monitoring system determines a maximum driving workload attributable to the driver based at least in part on one selected from the group consisting of (i) information pertaining to the driver of the vehicle and (ii) a driving condition of the vehicle, and wherein the vehicular cabin monitoring system classifies the driver based in part on the determined maximum driving workload.

21. The vehicular cabin monitoring system of claim 1, wherein, based at least in part on processing at the ECU of image data captured by the at least one interior-viewing camera, the vehicular cabin monitoring system identifies the driver of the vehicle.

22. The vehicular cabin monitoring system of claim 1, wherein a camera of the at least one interior-viewing camera is disposed at an interior rearview mirror assembly of the vehicle.

23. A vehicular cabin monitoring system, the vehicular cabin monitoring system comprising:

a first interior-viewing camera disposed at a vehicle equipped with the vehicular cabin monitoring system, the first interior-viewing camera viewing at least a driver of the vehicle and a passenger of the vehicle, wherein the first interior-viewing camera is operable to capture image data;

a second interior-viewing camera disposed at the vehicle, the second interior-viewing camera viewing at least a passenger of the vehicle, wherein the second interior-viewing camera is operable to capture image data;

wherein the first interior-viewing camera comprises an imaging array having at least one million photosensor elements arranged in rows and columns;

wherein the second interior-viewing camera comprises an imaging array having at least one million photosensor elements arranged in rows and columns;

an electronic control unit (ECU), the ECU comprising electronic circuitry and associated software, wherein the electronic circuitry comprises a data processor;

wherein image data captured by the first interior-viewing camera is transferred to the ECU and is processed at the ECU;

wherein image data captured by the second interior-viewing camera is transferred to the ECU and is processed at the ECU;

wherein, based at least in part on processing at the ECU of image data captured by the first interior-viewing camera, the vehicular cabin monitoring system monitors the driver of the vehicle;

wherein monitoring of the driver of the vehicle is based at least in part on at least one selected from the group consisting of (i) vehicle entertainment information, (ii) driver condition information and (iii) visual distraction information;

wherein, based at least in part on processing at the ECU of image data captured by the second interior-viewing camera, the vehicular cabin monitoring system monitors the passenger of the vehicle that is viewed by the second interior-viewing camera; and wherein, based at least in part on monitoring of the driver, the vehicular cabin monitoring system classifies the driver as being at least one selected from the group consisting of (i) overloaded, (ii) attentive and (iii) distracted;

wherein the driver is classified based in part on an estimated current driving workload of the driver of the vehicle; and wherein the estimated current driving workload is updated during operation of the vehicle.

24. The vehicular cabin monitoring system of claim 23, wherein the passenger viewed by the first interior-viewing camera and the passenger viewed by the second interior-viewing camera are the same person.

25. The vehicular cabin monitoring system of claim 23, wherein the vehicular cabin monitoring system monitors the passenger of the vehicle that is viewed by the first interior-viewing camera based in part on processing at the ECU of image data captured by the first interior-viewing camera.

26. The vehicular cabin monitoring system of claim 23, wherein the vehicular cabin monitoring system classifies the driver based in part on monitoring of the passenger.

27. The vehicular cabin monitoring system of claim 26, wherein, based on monitoring of the passenger, the vehicular cabin monitoring system determines activity of the passenger that is viewed by the second interior-viewing camera, and wherein the vehicular cabin monitoring system classifies the driver based in part on the determined activity of the passenger that is viewed by the second interior-viewing camera.

28. The vehicular cabin monitoring system of claim 23, wherein the driver is classified based in part on an estimated current driving workload of the driver of the vehicle.

29. The vehicular cabin monitoring system of claim 28, wherein the estimated current driving workload of the driver of the vehicle is based at least in part on a current driving condition of the vehicle.

30. The vehicular cabin monitoring system of claim 28, wherein the estimated current driving workload is estimated based at least in part on at least one selected from the group consisting of (i) a driving condition, (ii) a traffic condition and (iii) a driver reaction capacity.

31. The vehicular cabin monitoring system of claim 28, wherein the vehicular cabin monitoring system estimates a maximum driving workload of the driver based at least in part on a driving condition of the vehicle.

32. The vehicular cabin monitoring system of claim 28, wherein the estimated current driving workload is estimated based at least in part on a driving condition of the vehicle, and wherein the driving condition is estimated based on at least one selected from the group consisting of (i) traffic, (ii) infrastructure, (iii) weather and (iv) visibility.

33. The vehicular cabin monitoring system of claim 28, wherein the vehicular cabin monitoring system determines, at least in part via processing at the ECU of driver information pertaining to the driver of the vehicle, a maximum driving workload attributable to the driver.

34. The vehicular cabin monitoring system of claim 33, wherein the driver information comprises at least one selected from the group consisting of (i) braking behavior, (ii) acceleration behavior, (iii) lane keeping behavior, (iv) entertainment console usage, (v) climate control usage, (vi) audio data captured by an interior microphone of the vehicle, (vii) driver position, (viii) driver identification, (ix) driver style, (x) driver attention and (xi) driver health.

35. The vehicular cabin monitoring system of claim 23, wherein the vehicular cabin monitoring system determines a maximum driving workload attributable to the driver based at least in part on one selected from the group consisting of (i) information pertaining to the driver of the vehicle and (ii) a driving condition of the vehicle, and wherein the vehicular cabin monitoring system classifies the driver based in part on the determined maximum driving workload.

36. The vehicular cabin monitoring system of claim 23, wherein, based at least in part on processing at the ECU of image data captured by the first interior-viewing camera, the vehicular cabin monitoring system identifies the driver of the vehicle.

37. A vehicular cabin monitoring system, the vehicular cabin monitoring system comprising:

at least one interior-viewing camera disposed at a vehicle equipped with the vehicular cabin monitoring system, the at least one interior-viewing camera viewing at least a driver of the vehicle and a passenger of the vehicle, wherein the at least one interior-viewing camera is operable to capture image data;

wherein each camera of the at least one interior-viewing camera comprises an imaging array having at least one million photosensor elements arranged in rows and columns;

an electronic control unit (ECU), the ECU comprising electronic circuitry and associated software, wherein the electronic circuitry comprises a data processor;

wherein image data captured by each camera of the at least one interior-viewing camera is transferred to the ECU and is processed at the ECU;

wherein a driver-viewing camera of the at least one interior-viewing camera is disposed at an interior rearview mirror assembly of the vehicle;

wherein, based at least in part on processing at the ECU of image data captured by the driver-viewing camera disposed at the interior rearview mirror assembly of the vehicle, the vehicular cabin monitoring system monitors the driver of the vehicle;

wherein monitoring of the driver of the vehicle is based at least in part on at least one selected from the group consisting of (i) vehicle entertainment information, (ii) driver condition information and (iii) visual distraction information;

wherein, based at least in part on processing at the ECU of image data captured by the at least one interior-viewing camera, the vehicular cabin monitoring system monitors the passenger of the vehicle;

wherein, based at least in part on monitoring of the driver, the vehicular cabin monitoring system classifies the driver as being at least one selected from the group consisting of (i) overloaded, (ii) attentive and (iii) distracted;

wherein the driver is classified based in part on an estimated current driving workload of the driver of the vehicle; and wherein the estimated current driving workload is updated during operation of the vehicle.

38. The vehicular cabin monitoring system of claim 37, wherein the vehicular cabin monitoring system classifies the driver based in part on monitoring of the passenger.

39. The vehicular cabin monitoring system of claim 38, wherein, based at least in part on monitoring of the passenger, the vehicular cabin monitoring system determines activity of the passenger, and wherein the vehicular cabin monitoring system classifies the driver based in part on the determined activity of the passenger.

40. The vehicular cabin monitoring system of claim 37, wherein the at least one interior-viewing camera comprises a passenger-viewing camera that views at least the passenger of the vehicle, and wherein the vehicular cabin monitoring system monitors the passenger of the vehicle based at least in part on processing at the ECU of image data captured by the passenger-viewing camera.

41. The vehicular cabin monitoring system of claim 37, wherein the estimated current driving workload of the driver of the vehicle is based at least in part on a current driving condition of the vehicle.

42. The vehicular cabin monitoring system of claim 37, wherein the estimated current driving workload is estimated based at least in part on at least one selected from the group consisting of (i) a driving condition, (ii) a traffic condition and (iii) a driver reaction capacity.

43. The vehicular cabin monitoring system of claim 37, wherein the estimated current driving workload is estimated based at least in part on a driving condition of the vehicle, and wherein the driving condition is estimated based on at least one selected from the group consisting of (i) traffic, (ii) infrastructure, (ii weather and (iv) visibility.

44. The vehicular cabin monitoring system of claim 37, wherein the vehicular cabin monitoring system determines a maximum driving workload attributable to the driver based at least in part on one selected from the group consisting of (i) driver information pertaining to the driver of the vehicle and (ii) a driving condition of the vehicle, and wherein the vehicular cabin monitoring system classifies the driver based in part on the determined maximum driving workload.

45. The vehicular cabin monitoring system of claim 44, wherein the driver information comprises at least one selected from the group consisting of (i) braking behavior, (ii) acceleration behavior, (iii) lane keeping behavior, (iv) entertainment console usage, (v) climate control usage, (vi) audio data captured by an interior microphone of the vehicle, (vii) driver position, (viii) driver identification, (ix) driver style, (x) driver attention and (xi) driver health.

46. The vehicular cabin monitoring system of claim 37, wherein, based at least in part on processing at the ECU of image data captured by the driver-viewing camera, the vehicular cabin monitoring system identifies the driver of the vehicle.

* * * * *